(12) United States Patent
Hayes et al.

(10) Patent No.: US 8,944,952 B2
(45) Date of Patent: Feb. 3, 2015

(54) DIFFERENTIAL ASSEMBLY HAVING A CLUTCH COLLAR ACTUATOR MECHANISM

(71) Applicant: ArvinMeritor Technology, LLC, Troy, MI (US)

(72) Inventors: Brian D. Hayes, Newark, OH (US); Robert J. Martin, Newark, OH (US); Todd R. Ekonen, Howell, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/923,414

(22) Filed: Jun. 21, 2013

(65) Prior Publication Data

US 2014/0378263 A1   Dec. 25, 2014

(51) Int. Cl.
*F16H 48/20* (2012.01)
*F16H 48/24* (2006.01)

(52) U.S. Cl.
CPC ..................................... *F16H 48/24* (2013.01)
USPC ....................................................... 475/235

(58) Field of Classification Search
USPC ......... 475/220, 231, 233, 235, 237, 249, 250; 74/473.36, 335, 473.1, 473.12, 339, 74/96, 110
See application file for complete search history.

(56) References Cited

U.S. PATENT DOCUMENTS

| | | | |
|---|---|---|---|
| 4,271,722 A | 6/1981 | Campbell | |
| 4,555,962 A * | 12/1985 | Bucarelli | 475/86 |
| 7,048,668 B2 * | 5/2006 | Busch et al. | 475/231 |
| 8,292,774 B2 * | 10/2012 | Haggerty | 475/220 |
| 2004/0116236 A1* | 6/2004 | Busch et al. | 475/231 |
| 2007/0199404 A1 | 8/2007 | Mason | |
| 2011/0190091 A1* | 8/2011 | Uchida | 475/231 |

FOREIGN PATENT DOCUMENTS

| | | |
|---|---|---|
| DE | 10303984 A1 | 9/2004 |
| JP | S63297841 A | 5/1988 |

OTHER PUBLICATIONS

KAM™, Differentials Ltd., Traction and Drive Train Upgrades, Application Guide for Land Rover Vehicles, www.kamdiffs.com.
European Patent Office, Extended Search Report for the corresponding European Patent Application No. 14173251.1 mailed Oct. 10, 2014.

* cited by examiner

*Primary Examiner* — Justin Holmes
(74) *Attorney, Agent, or Firm* — Brooks Kushman P.C.

(57) ABSTRACT

A differential assembly having a clutch collar actuator mechanism. The clutch collar actuator mechanism includes an actuator and a fork that may pivot about a pivot axis to actuate a clutch collar.

20 Claims, 6 Drawing Sheets

DIFFERENTIAL ASSEMBLY HAVING A CLUTCH COLLAR ACTUATOR MECHANISM

TECHNICAL FIELD

This patent application relates to a differential assembly having a clutch collar actuator mechanism.

BACKGROUND

A differential locking system is disclosed in U.S. Patent Publication No. 2007/0199404.

SUMMARY

In at least one embodiment, a differential assembly is provided. The differential assembly may include first and second output shafts, a differential unit, a clutch collar, and a clutch collar actuator mechanism. The differential unit may control rotation of the first output shaft with respect to the second output shaft. The clutch collar may be moveably disposed on the second output shaft. The clutch collar actuator mechanism may have an actuator, a fork and a bias linkage. The actuator may move between a retracted position and an extended position. The fork may be configured to pivot about a pivot axis and may actuate the clutch collar. The bias linkage may pivotally connect the actuator to the fork.

In at least one embodiment, a differential assembly is provided. The differential assembly may include first and second output shafts, a differential unit, a clutch collar, and a clutch collar actuator mechanism. The differential unit may control rotation of the first output shaft with respect to the second output shaft and may have a case that has a case gear. The clutch collar may be moveably disposed on the second output shaft and may have a gear portion. The clutch collar actuator mechanism may include an actuator, a fork, and a bias linkage. The actuator may move between a retracted position and an extended position. The fork may be configured to pivot about a pivot axis and actuate the clutch collar. The bias linkage may connect the actuator to the fork. The bias linkage may store potential energy when the actuator moves from the extended position to the retracted position and the fork is inhibited from pivoting about the pivot axis.

In at least one embodiment, a differential assembly is provided. The differential assembly may include first and second output shafts, a clutch collar, and a clutch collar actuator mechanism. The clutch collar may be moveably disposed on the second output shaft. The clutch collar actuator mechanism may include an actuator and a fork. The actuator may move between a retracted position and an extended position. The fork may operatively connect the actuator to the clutch collar and may be configured to pivot about a pivot axis with respect to the actuator. The actuator may pivot the fork about the pivot axis when the actuator moves between the retracted and extended positions.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
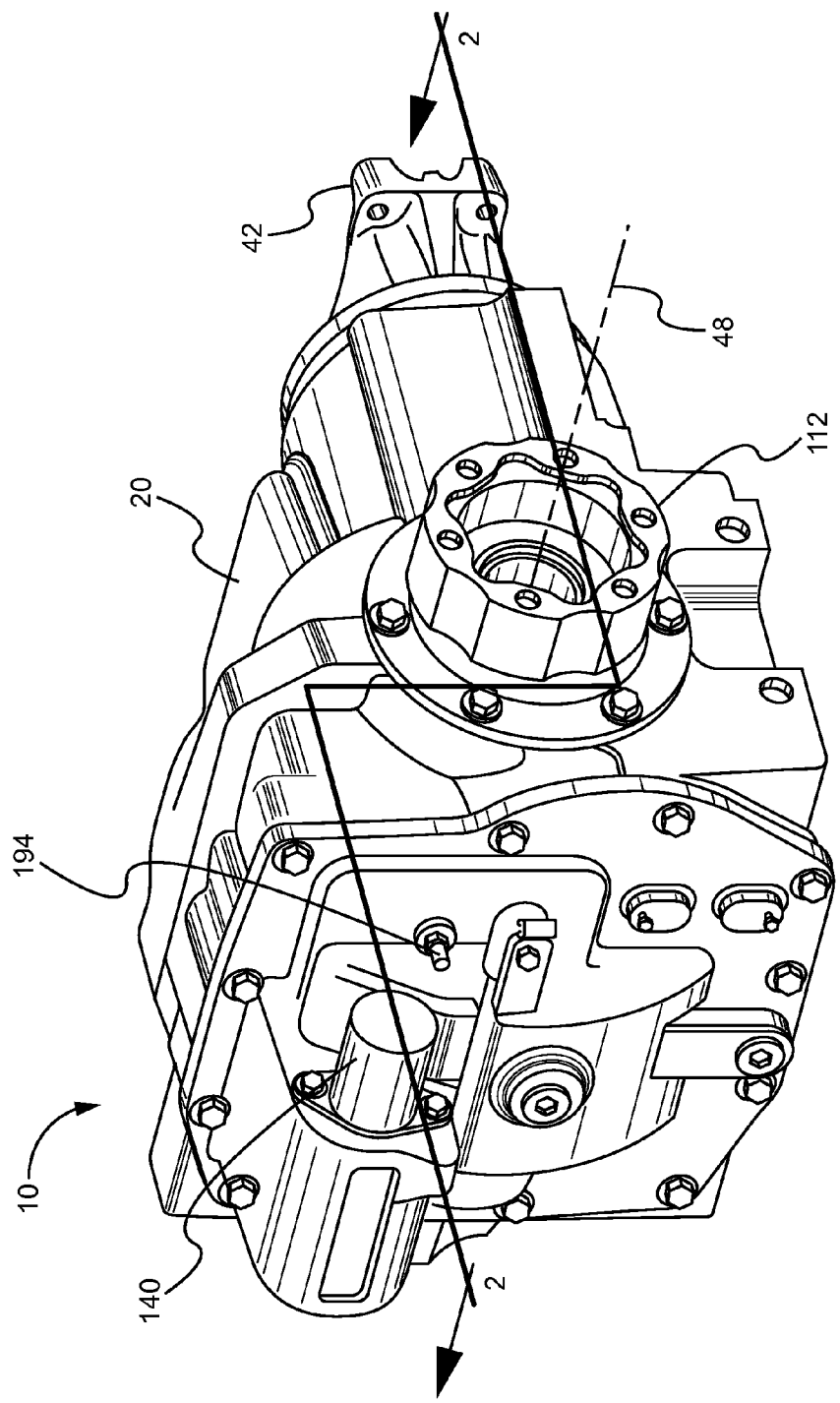
FIG. 1 is a perspective view of a differential assembly.
Figure 2:
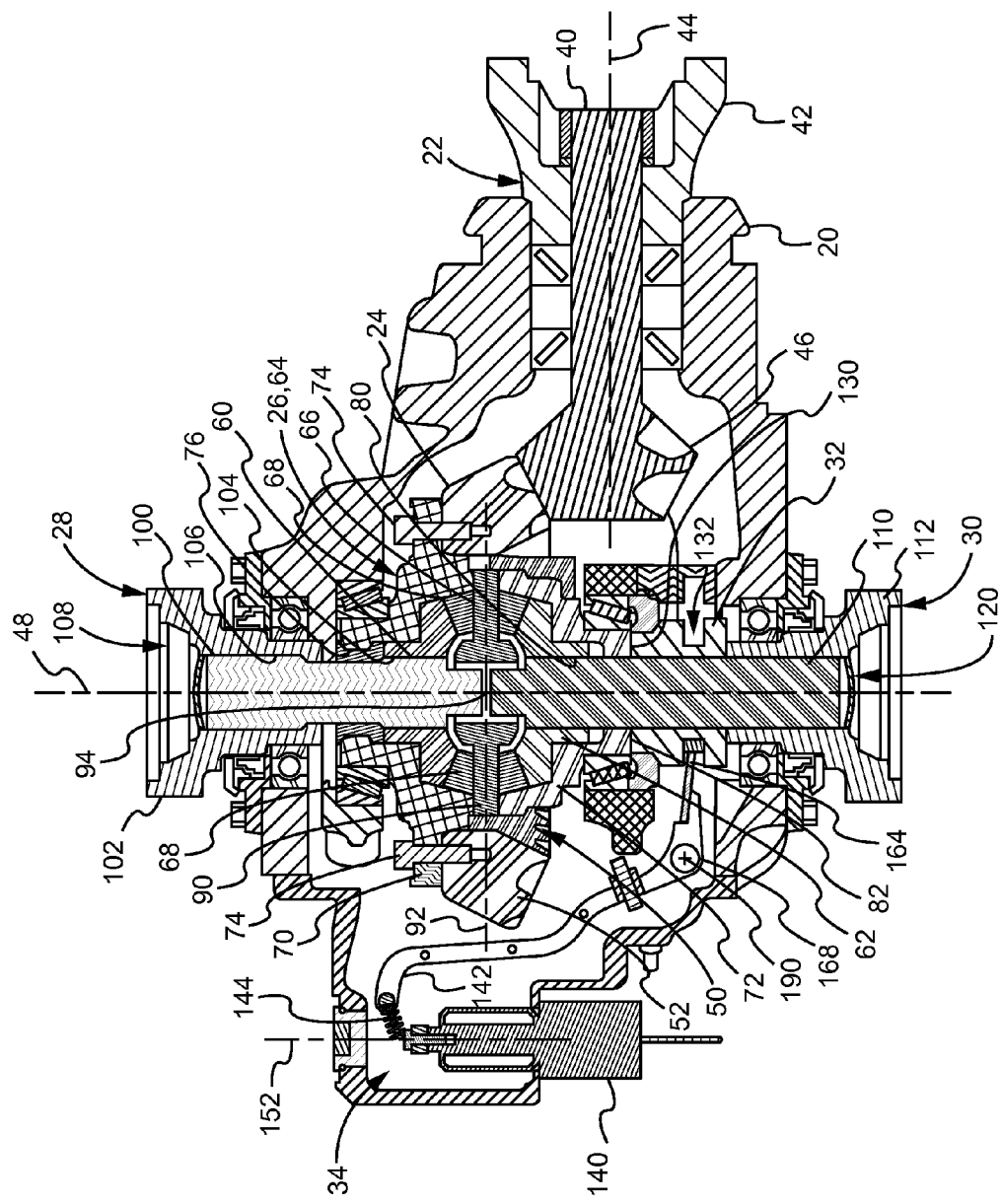
FIGS. 2 and 3 are section views of the differential assembly of FIG. 1 showing a clutch collar locked and unlocked positions, respectively
Figure 3:
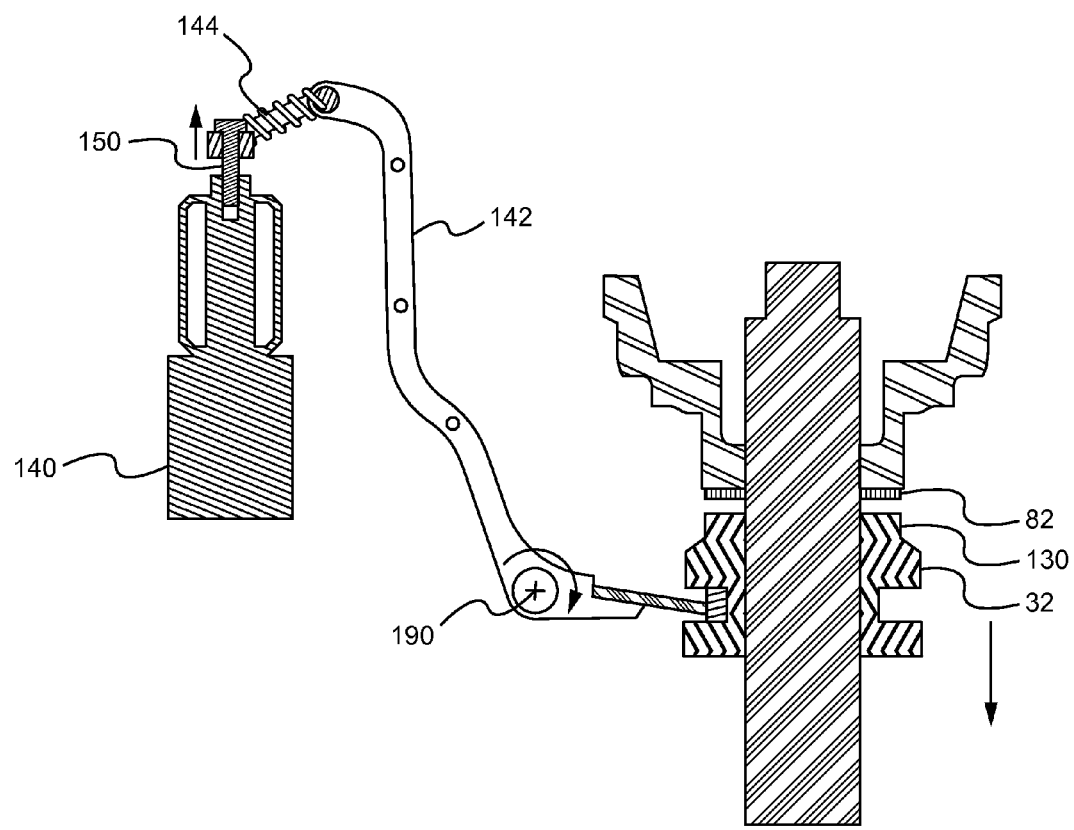

Referring to FIGS. 1 and 2, an exemplary differential assembly 10 is shown. The differential assembly 10 may be provided with a vehicle, such as a motor vehicle like a truck, bus, farm equipment, military transport or weaponry vehicle, or cargo loading equipment for land, air, or marine vessels. The differential assembly 10 may be configured to provide torque to at least one associated wheel assembly. In at least one embodiment, the differential assembly 10 may include a housing 20, an input shaft assembly 22, a drive gear 24, a differential unit 26, a first output shaft assembly 28, a second output shaft assembly 30, a clutch collar 32, and a clutch collar actuator mechanism 34.

The housing 20 may receive various components of the differential assembly 10. In addition, the housing 20 may facilitate mounting of the differential assembly 10 to the vehicle.

The input shaft assembly 22 may receive torque from a power source. For example, the input shaft assembly 22 may be operatively coupled to a transmission or transfer case that may receive torque from a power source like a motor or engine. In at least one embodiment, the input shaft assembly 22 may include an input pinion 40 and an input yoke 42.

The input pinion 40 may be configured to rotate about a first axis 44. For example, the input pinion 40 may be supported by one or more bearings that may be disposed in the housing 20. The bearings may facilitate rotation of the input pinion 40 about the first axis 44 while inhibiting axial movement of the input pinion 40 along the first axis 44. A pinion gear 46 may be disposed at a first end of the input pinion 40. The pinion gear 46 may have teeth that engage or mate with teeth on the drive gear 24.

The input yoke 42 may facilitate coupling of the differential assembly 10 to a power source. For instance, the input yoke 42 may be coupled to a drive shaft that may operatively connect the differential assembly 10 to a transmission, transfer case, or the like. The input yoke 42 may be fixedly positioned on the input pinion 40 and may be located at or near a second end of the input pinion 40 that is disposed opposite the pinion gear 46. For example, the input yoke 42 may include a center bore that may receive an end of the input pinion 40. The center bore and the input pinion 40 may be provided with mating splines that may help align and secure the input yoke 42 to the input pinion 40 such that the input yoke 42 may be inhibited from rotating with respect to the input pinion 40. A fastener, such as a nut, may be positioned near an end of the input pinion 40 to further secure and inhibit removal of the input yoke 42 from the input pinion 40.

The drive gear 24 may be configured to rotate about a second axis 48. The drive gear 24 may be configured as a ring gear and may have a center hole 50 and a set of teeth 52. The center hole 50 may extend around the second axis 48. The set of teeth 52 may be arranged around the center hole 50 and may engage and mate with corresponding teeth on the pinion gear 46.

The differential unit 26 may be disposed in the housing 20 and may be configured to permit the first and second output shaft assemblies 28, 30 to rotate at different speeds or inhibit the first and second output shaft assemblies 28, 30 from rotating at different speeds. The differential unit 26 may be generally disposed in the center hole 50 of the drive gear 24 and may include a first output gear 60, a second output gear 62, a case 64, a spider 66, and a plurality of pinion gears 68.

The first output gear 60 may be disposed proximate the first output shaft assembly 28. For example, the first output gear 60 may extend along the second axis 48 and may have a center bore. The center bore may have a spline that may receive and engage a corresponding spline on the first output shaft assembly 28 to inhibit rotation of the first output gear 60 with respect to the first output shaft assembly 28. The first output gear 60 may include a set of teeth that may be arranged on a side or face of the first output gear 60 that faces toward the spider 66 and pinion gears 68.

The second output gear 62 may be spaced apart from and disposed opposite the first output gear 60. The second output gear 62 may have substantially the same configuration as the first output gear 60 in one or more embodiments. The second output gear 62 may be disposed proximate the second output shaft assembly 30 and may extend along the second axis 48 and may have a center bore. The center bore may have a spline that may receive and engage a corresponding spline on the second output shaft assembly 30 to inhibit rotation of the second output gear 62 with respect to the second output shaft assembly 30. The second output gear 62 may also include a set of teeth that may be arranged on a side or face of the second output gear 62 that faces toward the spider 66 and pinion gears 68.

The case 64 may receive various components of the differential unit 26. The case 64 may be spaced apart from the housing 20, the first output shaft assembly 28, and the second output shaft assembly 30 to facilitate rotation of the case 64 with respect to these components. In the embodiment shown, the case 64 has a two piece construction that includes a first case portion 70 and a second case portion 72.

The first case portion 70 may be configured to rotate with respect to the housing 20. For instance, the first case portion 70 may be rotatably disposed on a bearing that may be disposed in the housing 20 and that may facilitate rotation of the first case portion 70 about the second axis 48. The first case portion 70 may support the drive gear 24. The drive gear 24 may be fixedly disposed on the first case portion 70 in any suitable manner, such as with one or more fasteners 74 like a bolt, to inhibit rotation of the drive gear 24 with respect to the first case portion 70. The first case portion 70 may include an opening 76. The opening 76 may be configured as a through hole that may extend along the second axis 48. The first output shaft assembly 28 may extend through the opening 76. In addition, the first output gear 60 may be rotatably disposed in the opening 76 such that the first output gear 60 may rotate about the second axis 48 with respect to the first case portion 70.

The second case portion 72 may be disposed opposite the first case portion 70. The second case portion 72 may be fixedly disposed on the first case portion 70 in any suitable manner, such as with one or more fasteners like bolts, to inhibit rotation of the second case portion 72 with respect to the first case portion 70. The second case portion 72 may be configured to rotate with respect to the housing 20. For instance, the second case portion 72 may be rotatably disposed on a bearing that may be disposed in the housing 20 and that may facilitate rotation of the second case portion 72 about the second axis 48. The second case portion 72 may include an opening 80 and a case gear 82.

The opening 80 may be configured as a through hole that may extend along the second axis 48. The second output shaft assembly 30 may extend through the opening 80. In addition, the second output gear 62 may be rotatably disposed in the opening 80 such that the second output gear 62 may rotate about the second axis 48 with respect to the second case portion 72.

The case gear 82 that may include a set of teeth that may be arranged on a side or face of the second case portion 72 that faces toward the clutch collar 32. In addition, the teeth of the case gear 82 may be radially disposed with respect to the second axis 48 and arranged around an outside circumference of the opening 80. The case gear 82 may selectively engage corresponding teeth on the clutch collar 32 as will be discussed in more detail below.

The spider 66 may be disposed in the case 64 and may be configured to rotate about the second axis 48. The spider 66 may include a center bore that may receive ends of the first and second output shaft assemblies 28, 30 such that the spider 66 may rotate about the second axis 48 with respect to the first and/or second output shaft assemblies 28, 30. The spider 66 may also include a set of pins 90. The pins 90 may extend away from the center bore and may be arranged along a first spider axis 92 and a second spider axis 94. The first spider axis 92 and the second spider axis 94 may intersect and may be disposed substantially perpendicular to each other and substantially perpendicular to the second axis 48. Ends of the pins 90 may be received in the case 64 and may be spaced apart from the housing 20 so as not to interfere with rotation of the differential unit 26. For instance, the pins 90 may be received between the first and second case portions 70, 72.

A pinion gear 68 may be rotatably disposed on each pin 90. Each pinion gear 68 may be generally disposed in the case 64 and may be retained on a corresponding pin 90 with a fastener, such as a thrust washer that may be coupled to or may engage the case 64. Two pinion gears 68 may rotate about pins 90 that extend along the first spider axis 92 and two pinion gears 68 may rotate about pins 90 that extend along the second spider axis 94. Each pinion gear 68 may include a set of teeth that mate with the first output gear 60 and the second output gear 62.

The first output shaft assembly 28 may help connect the differential assembly 10 to a vehicle wheel. More specifically, the first output shaft assembly 28 may connect the differential unit 26 to a wheel axle or half shaft that may receive a wheel hub assembly that may support a vehicle wheel. The first output shaft assembly 28 may be configured to rotate about the second axis 48 and may include a first output shaft 100 and a first coupling 102.

The first output shaft 100 may extend along the second axis 48 from the differential unit 26 to the first coupling 102. The first output shaft 100 may include a first spline 104 and a second spline 106. The first spline 104 may be disposed near a first end of the first output shaft 100 and may mate with a spline on the first output gear 60. As such, the first output shaft 100 may be inhibited from rotating with respect to the first output gear 60. The second spline 106 may be spaced apart from the first spline 104 and may mate with a corresponding spline on the first coupling 102.

The first coupling 102 may facilitate coupling of the first output shaft assembly 28 to a wheel axle. The first coupling 102 may be disposed proximate a second end of the first output shaft 100 that the disposed opposite the first end. The first coupling 102 may be configured to rotate with respect to the housing 20. For instance, the first coupling 102 may be rotatably disposed on a bearing that may be disposed in the housing 20 and that may facilitate rotation of the first coupling 102 about the second axis 48. The first coupling 102 may include a coupling opening 108. The coupling opening 108 may be configured as a through hole that may extend along the second axis 48. A spline may be disposed in the coupling opening 108. The first output shaft 100 may extend into the coupling opening 108 such that the second spline 106 mates with the spline in the coupling opening 108 to inhibit rotation of the first coupling 102 with respect to the first output shaft 100.

The second output shaft assembly 30 may also help connect the differential assembly 10 to a vehicle wheel. More specifically, the second output shaft assembly 30 may extend from an opposite side of the differential unit 26 than the first output shaft assembly 28 and may connect the differential unit 26 to a different wheel axle or half shaft that may receive a wheel hub assembly that may support a vehicle wheel. The second output shaft assembly 30 may be configured to rotate about the second axis 48 and may include a second output shaft 110 and a second coupling 112.

Figure 4:
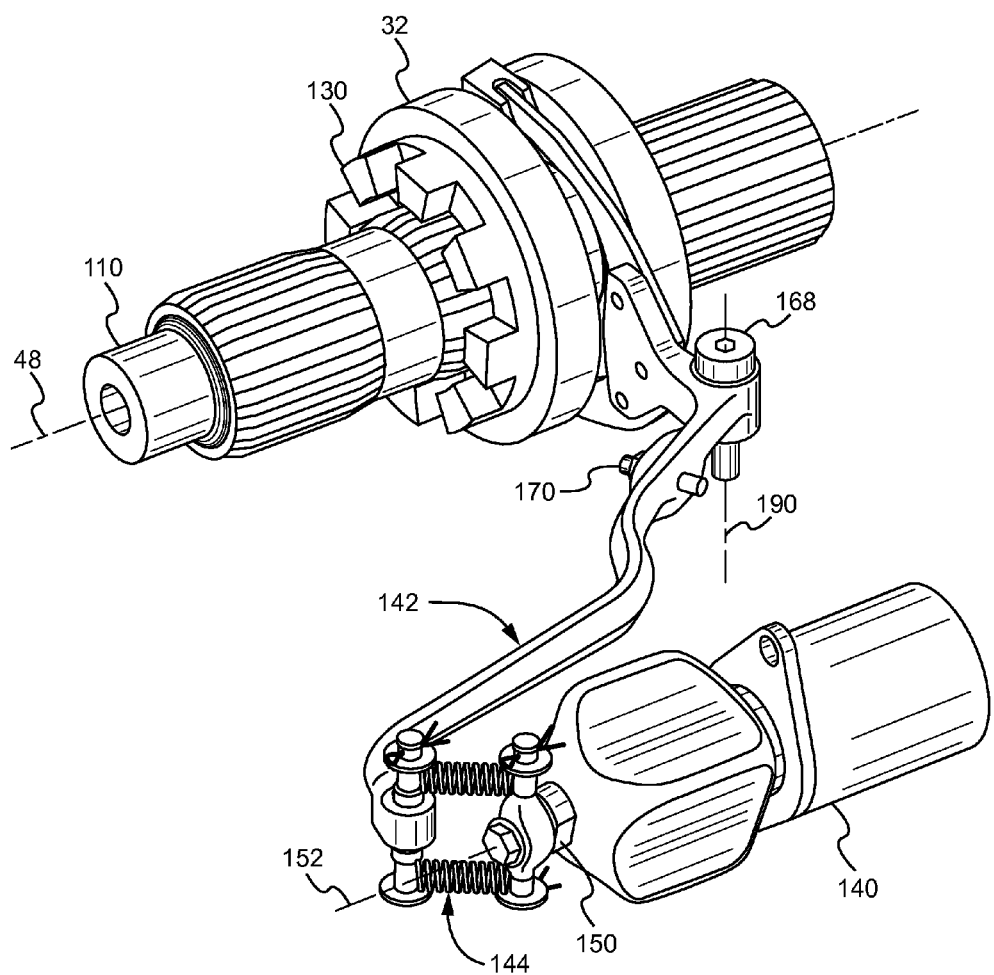
FIG. 4 is a perspective view of a clutch collar actuator mechanism.
Figure 5:
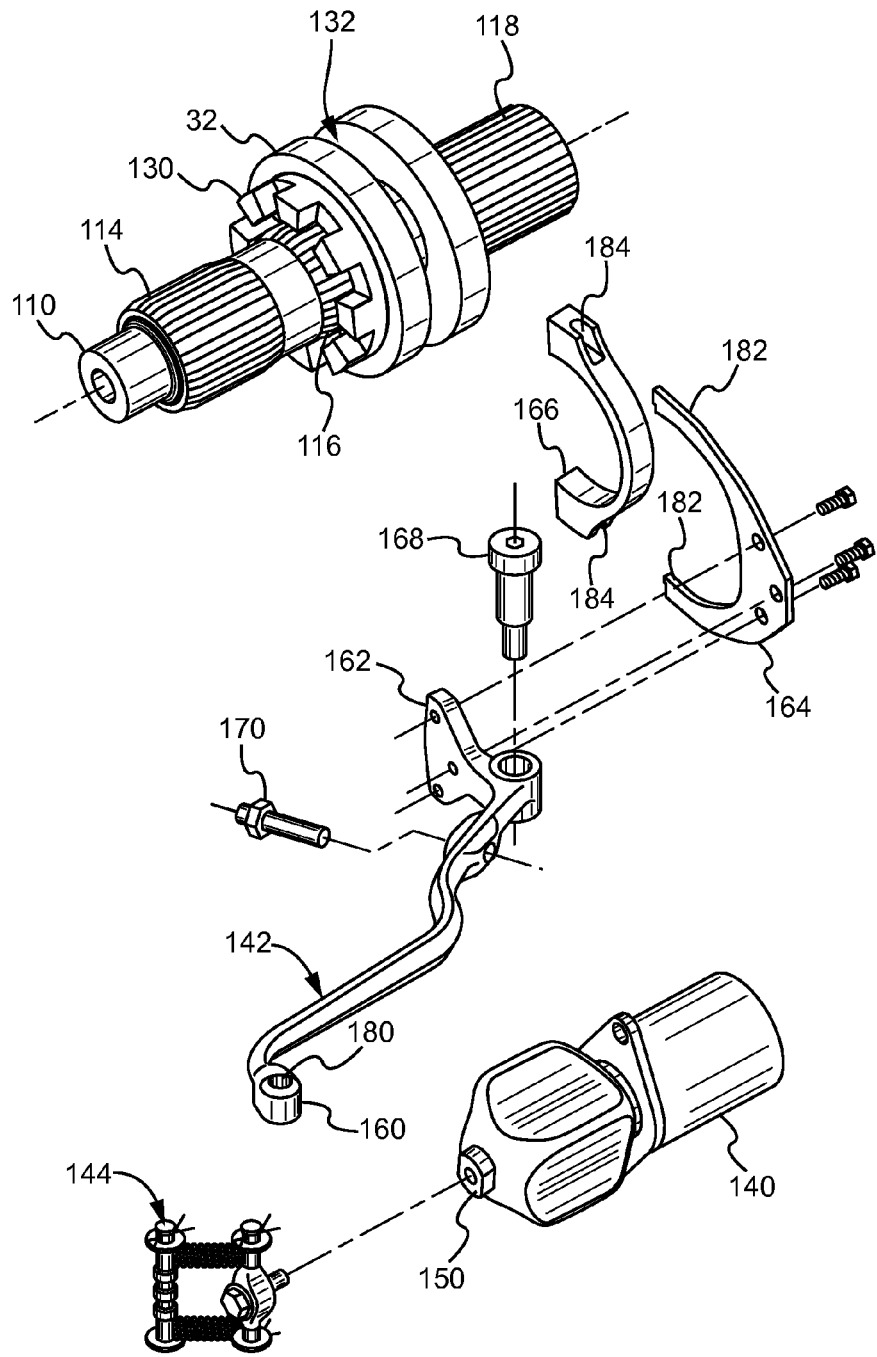
FIG. 5 is an exploded view of the clutch collar actuator mechanism.

The second output shaft 110 may extend along the second axis 48 from the differential unit 26 to the second coupling 112. The second output shaft 110 may be spaced apart from the first output shaft 100 and may include a first spline 114, a second spline 116 and a third spline 118 as is best shown in FIGS. 4 and 5. The first spline 114 may be disposed near a first end of the second output shaft 110 and may mate with a spline on the second output gear 62. As such, the second output shaft 110 may be inhibited from rotating with respect to the second output gear 62. The second spline 116 may be disposed between the first spline 114 and the third spline 118. The second spline 116 may be spaced apart from the first spline 114 and may mate with a spline on the clutch collar 32. As such, the clutch collar 32 may slide along the second output shaft 110 but may not rotate with respect to the second output shaft 110. The third spline 118 may be spaced apart from the second spline 116 and may mate with a corresponding spline on the second coupling 112.

The second coupling 112 may facilitate coupling of the second output shaft assembly 30 to a wheel axle. The second coupling 112 may have a similar or the same configuration as the first coupling 102. The second coupling 112 may be disposed proximate a second end of the second output shaft 110 that may be disposed opposite the first end. The second coupling 112 may be configured to rotate with respect to the housing 20. For instance, the second coupling 112 may be rotatably disposed on a bearing that may be disposed in the housing 20 and that may facilitate rotation of the second coupling 112 about the second axis 48. The second coupling 112 may include a coupling opening 120. The coupling opening 120 may be configured as a through hole that may extend along the second axis 48. A spline may be disposed in the coupling opening 120. The second output shaft 110 may extend into the coupling opening 120 such that the third spline 118 may engage the spline in the coupling opening 120 to inhibit rotation of the second coupling 112 with respect to the second output shaft 110.

The clutch collar 32 may be moveably disposed on the second output shaft assembly 30. More specifically, the clutch collar 32 may be disposed on the second output shaft 110 between the second case portion 72 and the second coupling 112. The clutch collar 32 may be generally ring-shaped and may include a gear portion 130 and an annular groove 132.

The gear portion 130 may include a set of teeth that may be arranged on a side or face of the clutch collar 32 that faces toward the case 64. The teeth of the gear portion 130 may selectively engage the case gear 82 of the second case portion 72. More specifically, the gear portion 130 may mate or mesh with the teeth of the case gear 82 when the clutch collar 32 is in a locked position and may not mate between or mesh with teeth of the case gear 82 when the clutch collar 32 is in an unlocked position. In the locked position, the clutch collar 32 may couple the case 64 to the second output shaft 110 such that the case 64 and second output shaft 110 rotate together about the second axis 48. As such, the first and second output shafts 100, 110 may not rotate at different velocities. In the unlocked position, the clutch collar 32 does not couple the case 64 to the second output shaft 110. As such, the first and second output shafts 100, 110 may rotate at different velocities.

The annular groove 132 may be spaced apart from the gear portion 130. The annular groove 132 may extend continuously around the clutch collar 32 and may receive a portion of the clutch collar actuator mechanism 34 as will be described in more detail below.

Referring to FIGS. 2-5, the clutch collar actuator mechanism 34 may facilitate positioning of the clutch collar 32. The clutch collar actuator mechanism 34 may include an actuator 140, a fork 142, and a bias linkage 144.

The actuator 140 may be configured to actuate or move the fork 142. In at least one embodiment, at least a portion of the actuator 140 may be disposed outside the housing 20 to reduce heat transfer to the actuator 140, such as may occur due to contact with lubricant inside the housing 20 that may be heated during operation of the differential assembly 10. The actuator 140 may be of any suitable type, such as a pneumatic, hydraulic, vacuum, mechanical, electrical, or electromechanical actuator. In at least one embodiment, the actuator 140 may be a linear actuator, such as a solenoid, that may have an actuator shaft 150 that moves linearly along an actuator axis 152 between a retracted position and an extended position. An actuator 140 configured as a solenoid may have a dual coil design in which a high current may be applied to retract the actuator shaft 150 from the extended position to the retracted position and a lower current may be applied to hold the actuator shaft 150 in the retracted position. High current may be applied for a short period of time to rapidly retract the actuator shaft 150 and avoid overheating of the coils of the solenoid. In addition, a non-pneumatic actuator such a solenoid may provide improved compatibility in vehicles without air brake or a pneumatic gas source.

The fork 142 may be disposed inside the housing 20 and may transfer force to actuate the clutch collar 32. In at least one embodiment, the fork 142 may be configured to flex and store energy when the actuator shaft 150 is retracted and movement of the clutch collar 32 to the locked position is inhibited by misalignment of the teeth of the gear portion 130 of the clutch collar 32 with teeth of the case gear 82 of the case 64 of the differential unit 26. The fork 142 may flex to release such stored energy when the teeth of the gear portion 130 of the clutch collar 32 attain alignment or become aligned with the teeth of the case gear 82. As such, the actuator 140 may move the actuator shaft 150 to the retracted position even when the clutch collar 32 is inhibited from moving to the locked position. Such a flexible fork 142 may be employed with or without the bias linkage 144. In addition, a flexible fork 142 may help improve engagement dynamics of the teeth of the gear portion 130 of the clutch collar 32 and may reduce chattering of the clutch collar when shifts are made while there is significant differential rotation.

In at least one embodiment, the fork 142 may have a first end 160, a second end 162, a fork member 164, a follower 166, a pivot pin 168, and a detection feature 170.

The first end 160 may be disposed proximate the actuator 140 and may be coupled to the bias linkage 144, if provided, or the actuator 140 if not provided. In at least one embodiment, the first end 160 may have a hole 180 that may receive the bias linkage 144.

The second end 162 may be disposed opposite the first end 160 and may be disposed proximate the annular groove 132 of the clutch collar 32.

The fork member 164 may be integrally formed with the fork 142 or may be provided as a separate component. In FIGS. 4 and 5, the fork member is disposed proximate the second end 162 and is fixedly disposed on the fork 142. The fork member 164 may include one or more arms 182. The arms 182 may engage and facilitate movement of the follower 166. The arms 182 may be spaced apart from each other and may flex slightly to help translate pivotal movement of the fork 142 into linear movement of the clutch collar 32.

The follower 166 may interconnect and may be disposed between the fork member 164 and the clutch collar 32. The follower 166 may have a C-shaped configuration and may be received in the annular groove 132 of the clutch collar 32. The follower 166 may include a curved surface that may face toward and may engage the clutch collar 32 in the annular groove 132 and a pair of notches 184. A notch 184 may be provided at opposite ends of the follower 166. Each notch 184 may each receive an arm 182 of the fork member 164.

The pivot pin 168 may facilitate rotation or pivoting of the fork 142 about a pivot axis 190. The pivot pin 168 may extend along the pivot axis 190 and may be disposed between the first end 160 and the second end 162. In at least one embodiment, pivot pin 168 may be mounted to the housing 20 and may extend through a hole in the fork 142.

The detection feature 170 may facilitate detection of the position of the fork 142 with a sensor 194. The detection feature 170 may be disposed between the first end 160 and the pivot pin 168 and may have any suitable configuration. For instance the detection feature 170 may be configured as a bolt or pin that may extend through a hole in the fork 142 or may be integrally formed with the fork 142. The sensor 194 may be configured as a proximity sensor that may detect the presence of the detection feature 170. The sensor 194 may be disposed on the housing 20 and/or extend through a hole in the housing 20 to facilitate an electrical connection with a power source and control module.

Referring to FIGS. 4 and 5, the bias linkage 144 may interconnect the actuator 140 and the fork 142. In addition, the bias linkage 144 may facilitate pivoting of the fork 142 with respect to the actuator 140 and allow the actuator shaft 150 to be fully actuated or move along its full travel length to the retracted position when the clutch collar 32 is either permitted or inhibited from moving to the locked position. In at least one embodiment, the bias linkage 144 may include a first member 200, a second member 202, at least one biasing member 204, and a rod 206.

The first member 200 may be coupled to the actuator 140. For example, the first member 200 may include a hole that may receive a fastener, such as a bolt, that may couple the first member 200 to the actuator shaft 150. The first member 200 may extend along a first member axis 210 and may include one or more grooves 212 that may help align and position a biasing member 204. The grooves 212 may extend completely around the first member 200 and may allow a corresponding biasing member 204 to rotate about the first member 200 and the first member axis 210 while inhibiting movement along the first member axis 210, or movement toward or away from the hole. One or more fasteners 214, such as a washer and cotter pin, may be disposed proximate an end of the first member 200 to keep a biasing member 204 from sliding off an end of the first member 200. For instance, a cotter pin may extend through a hole disposed proximate an end of the first member 200 and a washer may be disposed between the cotter pin and a biasing member 204.

The second member 202 may be coupled to the fork 142. For example, the second member 202 may extend through the hole 180 in the fork 142. The second member 202 may extend along a second member axis 220 and may include one or more grooves 222 that may help align and position a biasing member 204. The second member axis 220 may be disposed substantially parallel to the first member axis 210. The grooves 222 may extend completely around the second member 202 and may allow a corresponding biasing member 204 to rotate about the second member 202 and the second member axis 220. One or more fasteners 214, such as a washer and cotter pin, may be disposed proximate an end of the second member 202 to keep a biasing member 204 from sliding off an end of the second member 202.

Figure 6:
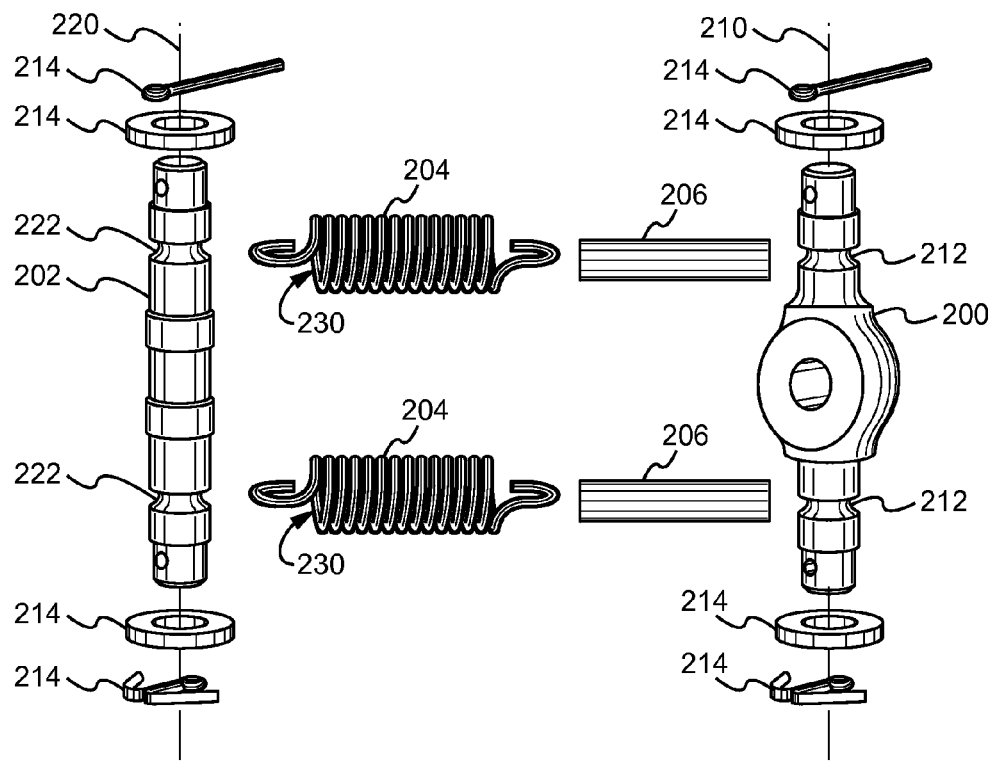
FIG. 6 is an exploded view of a bias linkage of the clutch collar actuator mechanism.

One or more biasing members 204 may interconnect the first member 200 to the second member 202. In FIG. 6, two biasing members 204 are shown, although it is contemplated that a greater or lesser number of biasing members may be provided. In at least one embodiment, each biasing member 204 may be configured as a spring, such as a coil spring that may have coils that help define a passage 230. A biasing member 204 may have a first end that engages the first member 200 and a second end that engages the second member 202. The first and second ends may be configured as hooks and may be disposed in a corresponding groove 212, 222 on the first and second members 200, 202, respectively. The biasing member 204 may exert a biasing force that resists extension or that biases the second member 202 toward the first member 200. As such, a biasing member 204 may store potential energy when stretched or expanded, such as when the actuator shaft 150 is actuated from the extended position to the retracted position and the clutch collar 32 is inhibited from moving fully to the locked position. The potential energy stored in the biasing member 204 may be released when the teeth of the gear portion 130 of the clutch collar 32 attain alignment or become aligned with the teeth of the case gear 82. Moreover, the stretching, flexing, and/or rotation of the biasing member 204 may permit the actuator shaft 150 to move to the retracted position even when the clutch collar 32 in inhibited from moving to the locked position due to misalignment of the teeth of the gear portion 130 and teeth of the case gear 82.

The rod 206 may help align or orient a biasing member 204. More specifically, the rod may be disposed in the passage 230 between the first and second ends of the biasing member 204. The rod 206 may be made of a polymeric material like nylon and may have a generally cylindrical configuration. The rod 206 may help align the coils of the biasing member 204 when the actuator shaft 150 is advanced or retracted, thereby encouraging the biasing members 204 to rotate about the first member axis 210 and/or second member axis 220 when actuated. In addition, opposing ends of the rod 206 may engage the first and/or second members 200, 202 to help transmit force from the actuator 140 to the fork 142 when the actuator shaft 150 is extended.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A differential assembly comprising:
   first and second output shafts;
   a differential unit that controls rotation of the first output shaft with respect to the second output shaft;
   a clutch collar moveably disposed on the second output shaft; and
   a clutch collar actuator mechanism that includes:
      an actuator that moves between a retracted position and an extended position;
      a fork that is configured to pivot about a pivot axis to actuate the clutch collar; and
      a bias linkage that is pivotally connected to the actuator and pivotally connected to the fork along a second pivot member axis that is spaced apart from the pivot axis.

2. The differential assembly of claim 1 wherein the bias linkage includes a first member that is coupled to the actuator, a second member that is coupled to the fork, and a first biasing member that extends from the first member to the second member.

3. The differential assembly of claim 2 wherein the first member is spaced apart from the second member.

4. The differential assembly of claim 2 wherein the first biasing member is configured to pivot with respect to the first member and the second member.

5. The differential assembly of claim 2 further comprising a rod that extends through the first biasing member.

6. The differential assembly of claim 2 wherein the first biasing member is compressed when the actuator is in the extended position.

7. The differential assembly of claim 2 further comprising a second biasing member that extends from the first member to the second member, wherein the second biasing member is spaced apart from the first biasing member.

8. The differential assembly of claim 7 further comprising a rod that extends through the second biasing member.

9. A differential assembly comprising:
   first and second output shafts;
   a differential unit that controls rotation of the first output shaft with respect to the second output shaft, wherein the differential includes a case that has a case gear;
   a clutch collar that is moveably disposed on the second output shaft and that has a gear portion; and
   a clutch collar actuator mechanism that includes:
      an actuator that moves between a retracted position and an extended position;
      a fork that is configured to pivot about a pivot axis and actuate the clutch collar; and
      a bias linkage that connects the actuator to the fork;
   wherein the bias linkage stores potential energy when the actuator moves from the extended position to the retracted position and the fork is inhibited from pivoting about the pivot axis.

10. The differential assembly of claim 9 wherein the fork is inhibited from pivoting about the pivot axis when the gear portion is misaligned with the case gear.

11. The differential assembly of claim 10 wherein the bias linkage exerts a biasing force that rotates the fork and actuates the clutch collar when the gear portion becomes aligned with the case gear.

12. The differential assembly of claim 11 wherein the bias linkage actuates the clutch collar when the actuator is in the retracted position.

13. The differential assembly of claim 9 wherein the actuator is a solenoid and is disposed outside a housing of the differential assembly.

14. The differential assembly of claim 9 wherein the fork is configured to flex when teeth of the gear portion are misaligned and do not mesh with teeth of the case gear.

15. A differential assembly comprising:
    a differential having a case;
    first and second output shafts disposed proximate the differential;
    a clutch collar moveably disposed on the second output shaft; and
    a clutch collar actuator mechanism that includes:
       an actuator that moves between a retracted position and an extended position; and
       a fork that operatively connects the actuator to the clutch collar, wherein the fork is configured to pivot about a pivot axis with respect to the actuator;
    wherein the actuator pivots the fork about the pivot axis when the actuator moves between the retracted and extended positions such that a pulling force exerted by the actuator when the actuator moves from the extended position to the retracted position pivots the fork to engage the clutch collar to the case.

16. The differential assembly of claim 15 wherein the clutch collar moves toward the first output shaft when the actuator moves from the extended position to the retracted position.

17. The differential assembly of claim 16 wherein the clutch collar moves away from the first output shaft when the actuator moves from the retracted position to the extended position.

18. The differential assembly of claim 15 wherein the clutch collar has an annular groove and the clutch collar actuator mechanism further comprises a follower that is disposed in the annular groove and that engages and couples the fork to the clutch collar.

19. The differential assembly of claim 18 wherein the fork pivots about the pivot axis with respect to the follower.

20. The differential assembly of claim 15 wherein the fork flexes and actuates the clutch collar toward the first output shaft when the actuator is in the retracted position and teeth on a gear portion of the clutch collar become aligned with teeth of a case gear of a differential unit that controls rotation of the first output shaft with respect to the second output shaft.

* * * * *